United States Patent [19]
Mueller et al.

[11] Patent Number: 6,070,830
[45] Date of Patent: Jun. 6, 2000

[54] FACETED EXHAUST NOZZLE

[75] Inventors: John H. Mueller, Cincinnati; Steven Scavo, Mason, both of Ohio

[73] Assignee: General Electric Company, Cincinnati, Ohio

[21] Appl. No.: 08/939,797

[22] Filed: Sep. 29, 1997

[51] Int. Cl.⁷ .................................................. B64B 1/36
[52] U.S. Cl. ................ 244/73 R; 244/53 R; 239/265.23; 239/265.39; 239/265.43; 239/265.17
[58] Field of Search ................................ 244/73 R, 53 R; 239/265.23, 265.39, 265.43, 265.17, 265.25, 265.33, 265.37, 546, 265.11, 601; 496/56; 60/235

[56] References Cited

U.S. PATENT DOCUMENTS

| | | |
|---|---|---|
| 2,841,955 | 7/1958 | McLafferty . |
| 3,353,356 | 11/1967 | Williams . |
| 3,391,869 | 7/1968 | Glass . |
| 4,387,564 | 6/1983 | Carey . |
| 4,707,899 | 11/1987 | Singer . |
| 4,733,975 | 3/1988 | Komanetsky et al. . |
| 4,754,926 | 7/1988 | Singer . |
| 5,082,182 | 1/1992 | Bruchez, Jr. et al. . |

*Primary Examiner*—Peter M. Poon
*Assistant Examiner*—Tion Dinh
*Attorney, Agent, or Firm*—Andrew C. Hess; Rodney M. Young

[57] ABSTRACT

A fixed geometry duct defining a gas turbine engine exhaust nozzle includes a plurality of circumferentially adjoining flat triangular facets and coaxial first and second openings at opposite ends thereof. A method of making the duct includes scribing a plurality of lines on a flat sheet metal plate to define the facets, and bending the plate at each of the lines to form the duct.

31 Claims, 9 Drawing Sheets

FACETED EXHAUST NOZZLE

CROSS REFERENCE TO RELATED APPLICATION

The present invention relates to concurrently filed patent applications Ser. No. 08/939,799 entitled "Integrated Fluidic CD Nozzle"; and Ser. No. 08/939,384 entitled "Fluidic Throat Exhaust Nozzle."

The U.S. Government has rights in this invention in accordance with contract No. F33615-91-C-2119 awarded by the Department of the Air Force.

BACKGROUND OF THE INVENTION

The present invention relates generally to gas turbine engines, and, more specifically, to exhaust nozzles therefor.

In a typical gas turbine engine configured for powering an aircraft in flight to supersonic velocities, an afterburner or augmenter is provided for burning additional fuel and providing additional thrust from the engine. Since the aircraft has an extensive flight envelope requiring different power requirements from the engine, the exhaust nozzle is typically variable for maximizing engine efficiency and performance over the flight envelope. The exhaust nozzle typically converges in flow area to a throat of minimum flow area from which the exhaust gases may expand. In a typical engine, a diverging nozzle extends aft from the converging nozzle to create a combined converging-diverging (CD) exhaust nozzle.

The converging and diverging nozzles are typically formed of a plurality of circumferentially adjoining primary and secondary exhaust flaps joined together with cooperating outer flaps in a conventional four-bar linkage. Suitable actuators are provided for adjusting the kinematics of the exhaust nozzle to vary the flow areas of the converging and diverging nozzle portions thereof as required during the flight envelope.

Accordingly, the typical CD exhaust nozzle is an assembly of many components which must be suitably actuated, sealed, and cooled for effective operation. However, this is obtained with an increase in complexity, weight, and cost of the engine due to the additional components required therefor and associated manufacturing costs.

Fixed geometry CD nozzles are known and may be used for a limited range of engine variability. However, a relatively complex shape of fixed nozzles typically requires relatively complex manufacturing processes and equipment in the form of expensive dies, forms, and tooling specifically configured therefor.

Accordingly, an improved fixed geometry CD exhaust nozzle having a simple construction and process of manufacture are desired for reducing engine complexity, weight, and cost.

SUMMARY OF THE INVENTION

A fixed geometry duct defining a gas turbine engine exhaust nozzle includes a plurality of circumferentially adjoining flat triangular facets and coaxial first and second openings at opposite ends thereof. A method of making the duct includes scribing a plurality of lines on a flat sheet metal plate to define the facets, and bending the plate at each of the lines to form the duct.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
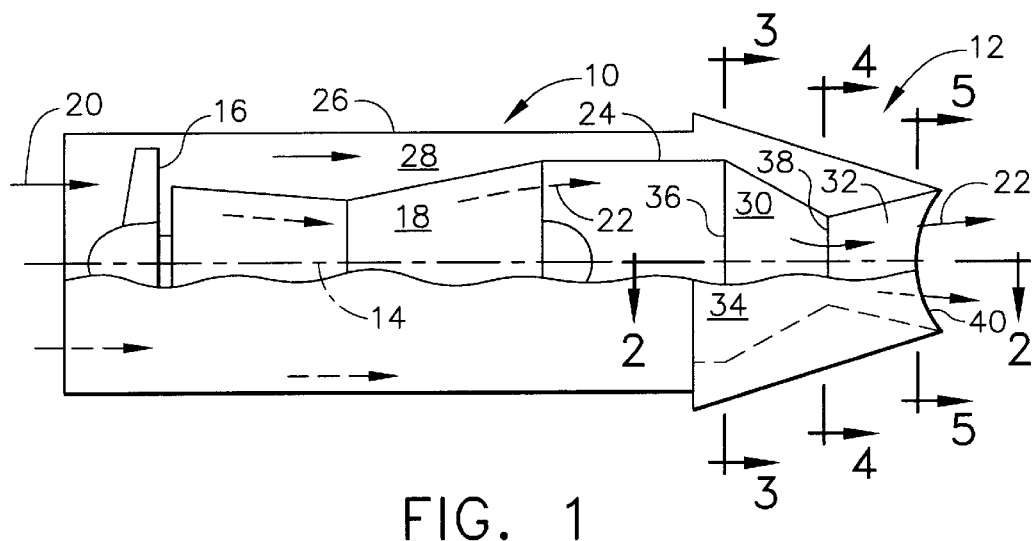
FIG. 1 is a schematic representation of an exemplary augmented turbofan gas turbine engine having an exhaust nozzle in accordance with an exemplary embodiment of the present invention.

Illustrated schematically in FIG. 1 is an exemplary augmented turbofan gas turbine engine 10 configured for powering an aircraft (not shown) in flight to supersonic velocity. The engine 10 includes a fixed geometry exhaust nozzle 12 in accordance with an exemplary embodiment of the present invention. The engine 10 itself is axisymmetrical about an axial centerline axis 14 and may take any conventional form including a fan 16 powered by a core engine 18. The core engine 18 includes a multistage compressor for compressing a portion of air 20 which is mixed with fuel in a combustor and ignited for generating hot combustion gases 22 which are expanded in one or more stages of turbines for powering the fan 16 and producing propulsion thrust.

The engine 10 also includes an afterburner or augmenter 24 extending aft from the core engine 18, which may take any conventional form for injecting on demand additional fuel into the combustion gases 22 and ignited for increasing propulsion thrust from the engine 10 when desired. The engine 10 includes an annular outer casing 26 which is spaced radially outwardly around the fan 16, core engine 18, and augmenter 24 to define an annular bypass duct 28 through which a portion of the air 20 from the fan 16 is channeled downstream for cooling various components in the augmenter 24 and exhaust nozzle 12 in a suitable manner.

Figure 2:
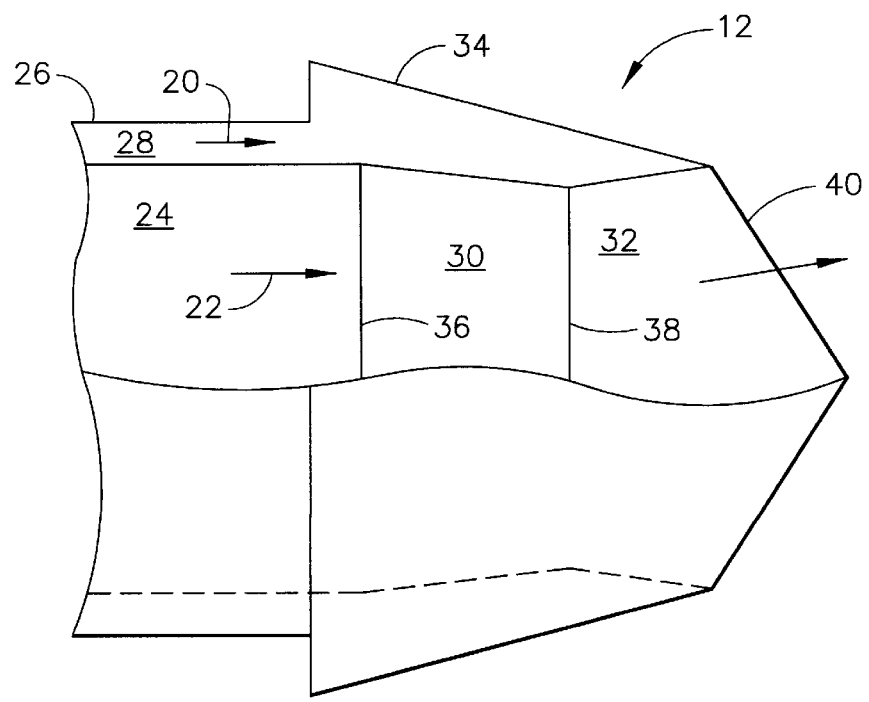
FIG. 2 is a horizontal sectional view through the exhaust nozzle illustrated in FIG. 1 and taken along line 2—2.

As shown in more detail in FIG. 2, the exhaust nozzle 12 includes an annular, fixed geometry converging duct or nozzle 30 suitably joined in flow communication with the augmenter 24 for receiving the combustion gases 22 which are exhausted through the exhaust nozzle 12. The exhaust nozzle 12 further includes a diverging duct or nozzle 32 joined in flow communication with the converging nozzle 30 for receiving the exhaust gases 22 therefrom for discharge into the atmosphere for producing thrust. Surrounding both the converging and diverging nozzles 30, 32 is an outer duct or casing 34 configured for providing an aerodynamically smooth interface with the surrounding atmosphere. The outer casing 34 is fixedly joined at its aft end to the aft end of the diverging nozzle 32, and is fixedly joined at its forward end to the aft end of the engine outer casing 26.

The exhaust nozzle 12 includes an annular inlet 36 at the junction of the converging nozzle 30 and the augmenter 24 for receiving the exhaust gases 22 therefrom. The nozzle 12 also includes an annular throat 38 at the junction of the converging and diverging nozzles 30, 32 having minimum flow area typically designated $A_8$. And, the nozzle 12 also includes an annular outlet 40 at the aft end of the diverging nozzle 32 which is larger in area than the throat 38 and has an area typically designated $A_9$.

In the exemplary embodiment of the exhaust nozzle 12 illustrated in FIGS. 1 and 2, the nozzle 12 transitions from a generally circular inlet 36 to a generally elliptical throat 38 having a major axis in the horizontal plane and a smaller minor axis in the vertical plane, and further transitions to a larger elliptical outlet 40 with a similar horizontal major axis and vertical minor axis. The nozzle outlet 40 is also suitably scarfed rearwardly in a symmetric triangular configuration with an apex at the aftmost end of the nozzle. This generally flattened configuration for the exhaust nozzle 12 is provided for enhanced performance. And in the exemplary embodiment illustrated in FIGS. 1 and 2, an annular slot (not shown) is provided at the throat 38 and suitably joined in flow communication with the bypass duct 28 for selectively receiving a portion of the bypass air 20 for fluidically varying the effective throat area $A_8$ for providing effective performance variability in the otherwise fixed geometry exhaust nozzle 12.

Since the exhaust nozzle 12 varies both in contour and flow area from its inlet 36 to throat 38 to outlet 40, the complexity of conventionally manufacturing the nozzles 30, 32 and outer casing 34 increases. These components may not simply be rolled into their annular shapes. Although these components could be manufactured in pieces using dies, forms, or corresponding tooling, this approach is relatively expensive.

Since these individual components 30, 32, 34 are annular in profile and basically tubes, they may be manufactured in accordance with the present invention from simple sheet metal flat plates suitably formed for obtaining the respective varying profiles thereof and with attendant structural rigidity.

Figure 3:
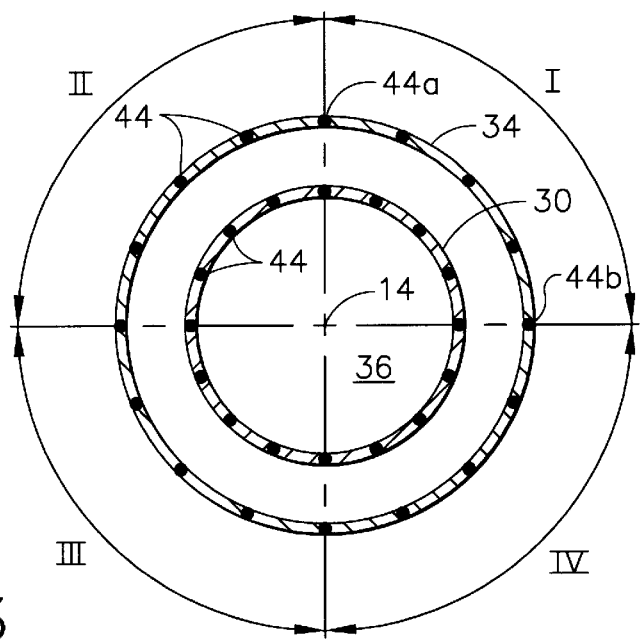
FIG. 3 is an elevational sectional view through an inlet of the exhaust nozzle illustrated in FIG. 1 and taken along line 3—3.
Figure 4:
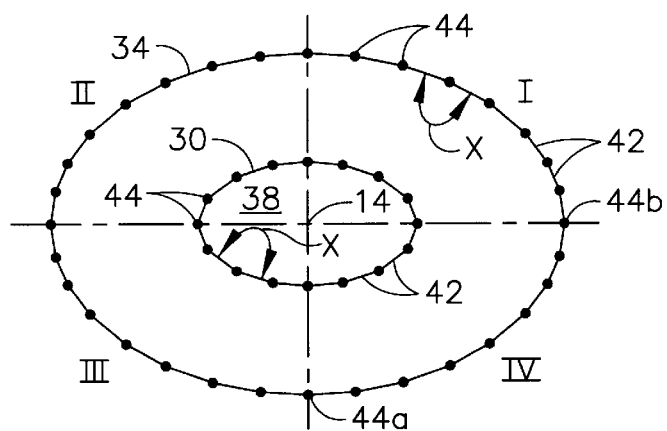
FIG. 4 is an elevational sectional view through a throat of the exhaust nozzle illustrated in FIG. 1 and taken generally along line 4—4.
Figure 5:
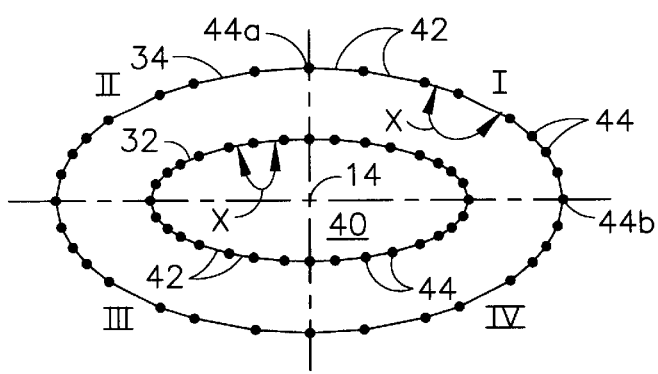
FIG. 5 is an elevational sectional view through an outlet of the exhaust nozzle illustrated in FIG. 1 and taken along line 5—5.

More specifically, FIGS. 3, 4, and 5 illustrate schematically three radial sections of the exhaust nozzle 12 illustrated in FIG. 1 at the inlet 36, throat 38, and outlet 40, respectively. The exhaust nozzle 12 is initially aerodynamically designed in any conventional manner for defining the required converging and diverging area ratios within the corresponding nozzles 30, 32 for maximizing nozzle performance at a specific design point. The resulting aerodynamic profile or contours are preferably smooth for reducing pressure losses in the nozzle, and as generally shown in FIGS. 3–5 vary in this exemplary embodiment from circular to elliptical. Since an elliptical contour would be difficult and expensive to manufacture conventionally, they are instead segmented into a suitable number of flat facets 42 shown in particular in FIGS. 4 and 5. The facets 42 circumferentially adjoin each other at corresponding straight facet lines 44, designated by section dots in FIGS. 3–5, to collectively and piecewise define the annular profile or contour of the nozzles 30, 32 and casing 34 in a flat segmented approximation of the optimum aerodynamic smooth elliptical contours.

As shown in FIGS. 3–5, the perimeters of each of the nozzles 30, 32 and casing 34 are divided by the lines 44 into a suitable number of segments for best approximating the desired contours thereof, such as the elliptical contours with varying aspect ratios between the major and minor axes thereof. This may be done by trial and error or by suitable mathematical approximations as desired.

Figure 6:
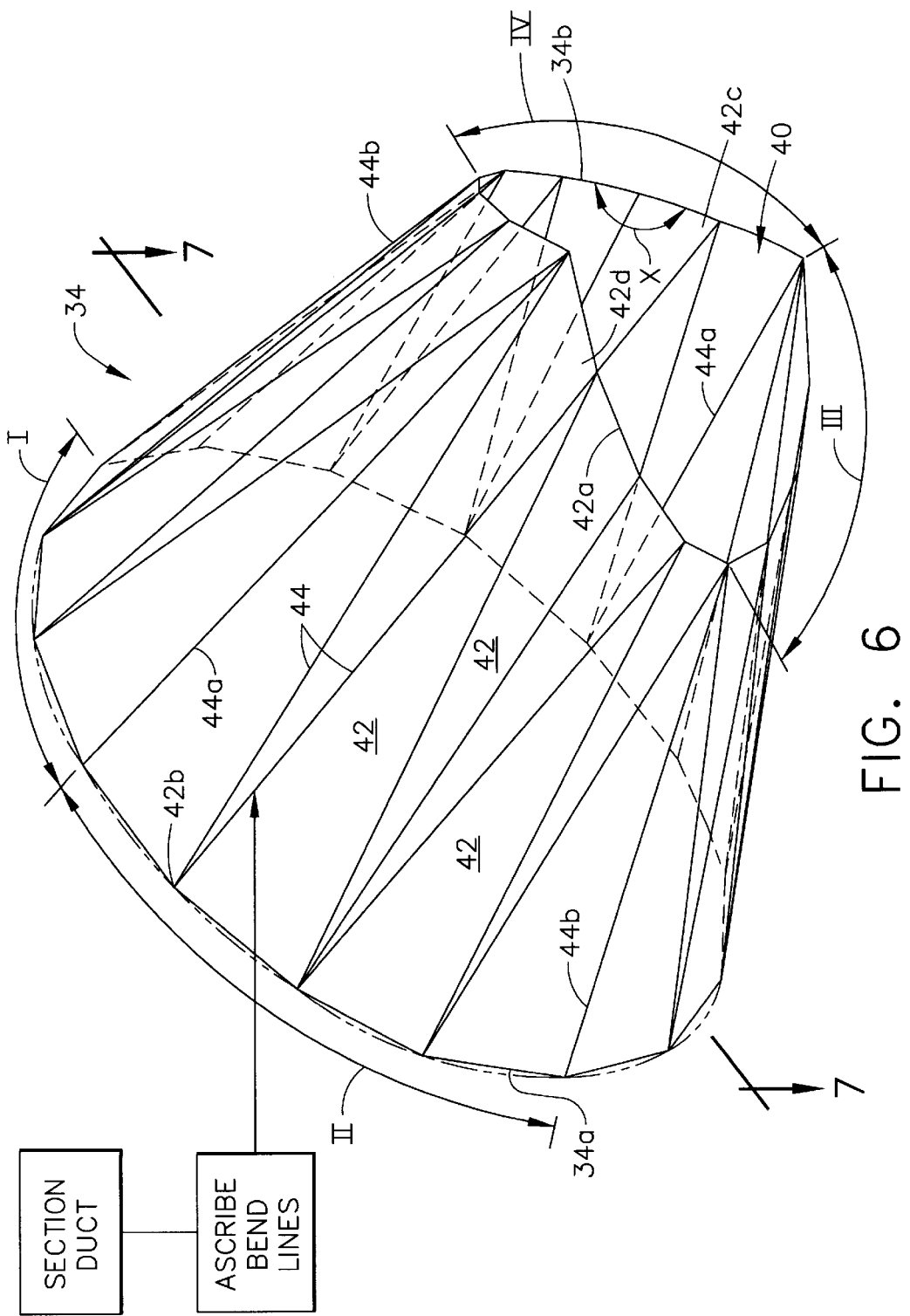
FIG. 6 is an isometric view of an outer casing of the exhaust nozzle illustrated in FIG. 1.
Figure 7:
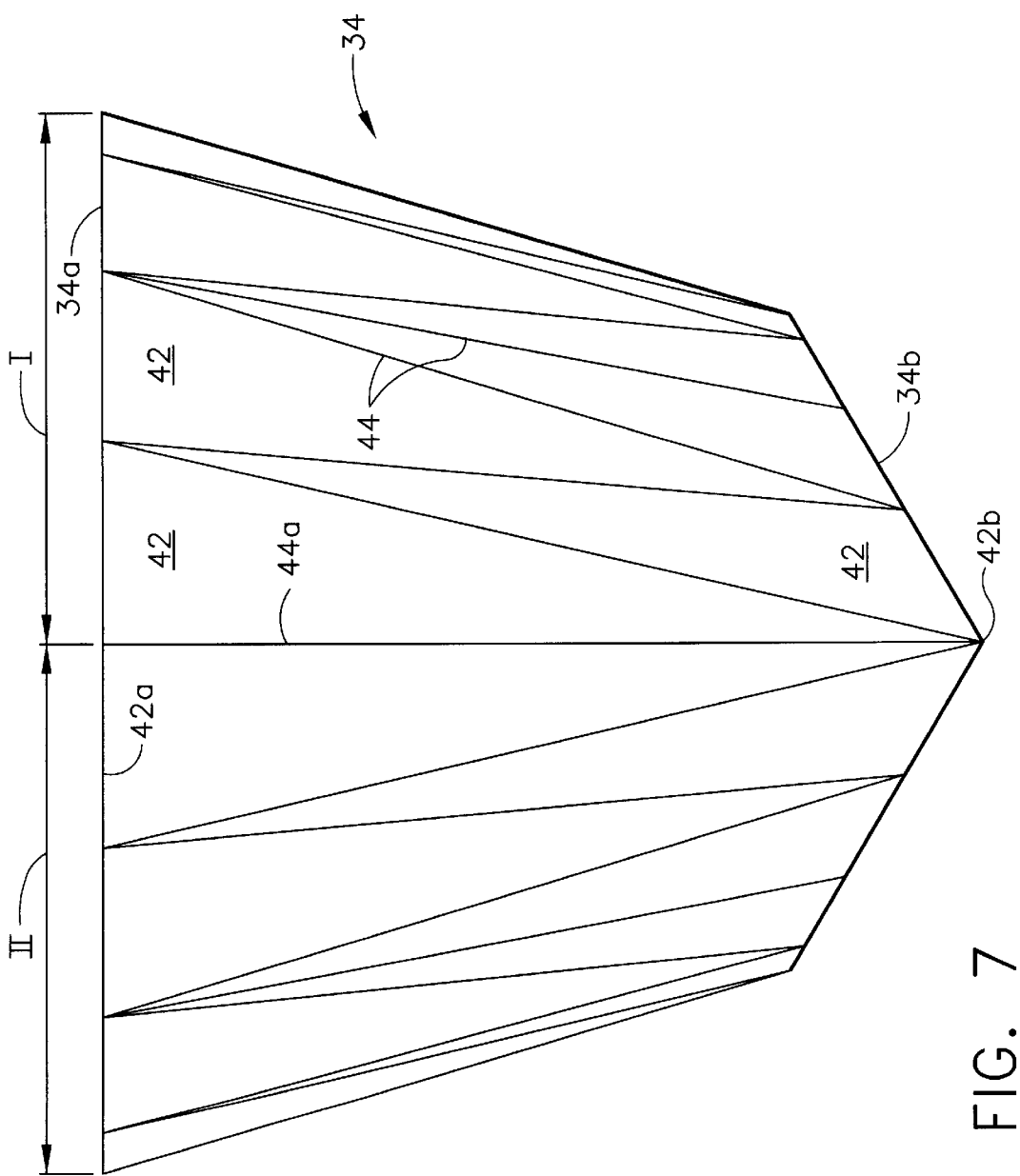
FIG. 7 is a top view of the outer casing illustrated in FIG. 6 and taken along line 7—7.

FIGS. 6 and 7 illustrate in more particularity the outer casing 34 partitioned into a suitable number of facets 42 in accordance with an exemplary embodiment of the present invention. In this embodiment, the outer casing 34 is a relatively simple annular duct varying in profile from a first opening 34a at an upstream end which is piecewise circular, to a coaxial second opening 34b at an opposite axial end which has a smaller elliptical contour for matching the diverging nozzle 32 disposed therein for defining the nozzle outlet 40.

Shown in phantom line around the first opening 34a in FIG. 6 is the optimum circular contour which is suitably approximated around the circumference by the circumferentially adjoining facets 42. Since both the area and contour of the outer casing 26 varies between the first and second openings 34a,b thereof, the facets 42 are preferably flat triangular facets which circumferentially adjoin each other to collectively define an annular duct wall to best approximate the optimum shape of the outer casing 34.

Each of the triangular facets 42 has a respective straight base 42a and opposite apex 42b, with two sides defined by the straight lines 44. By suitably alternating the bases 42a and apexes 42b of the facets 42, at least in part, the entire outer casing 34 may be defined by only flat triangular facets 42 circumferentially adjoining each other. The individual facets 42 may vary in width as required to best approximate the desired contours of the casing 34, which in the exemplary embodiment illustrated in FIGS. 6 and 7 varies in area and contour between the opposite first and second openings 34a,b having different areas and contours.

The facets 42 and lines 44 may be arranged in various configurations, by trial and error for example, to best approximate the desired aerodynamic contour of the outer casing 34. For example, each facet 42 includes a radially inner surface 42c and an opposite radially outer surface 42d, with adjacent inner surfaces 42c adjoining each other about a respective facet line 44 at an included facet angle X as illustrated in FIG. 6, as well as in FIGS. 4 and 5. The facets 42 and lines 44 may be selected so that most, if not all, of the inner facet angles X are less than 180°, or obtuse. In this way, the facet outer surfaces 42d adjoin at corresponding angles greater than 180° for providing a relatively smooth aerodynamic surface for reducing drag with the ambient outside air during operation.

However, depending upon the specific configuration of the casing 34 and the specific selection of the facets 42 and lines 44, some of the inner facet angles X may be larger than 180°, while adjacent inner facet angles X are less then 180° for best matching the desired profiles. The selection of facet angles may be determined for each design application depending upon the specific use of the faceted duct such as the outer casing 34, and the converging and diverging nozzles 30, 32 wherein the inner surfaces thereof should be aerodynamically smooth for channeling the exhaust gases 22 without undesirable pressure losses.

Since the exhaust nozzle 12 illustrated in FIGS. 1–5 is axisymmetrical about the centerline axis 14, the respective nozzles 30, 32 and casing 34 may be defined in four symmetrical quadrants designated by Roman numerals I, II, III, and IV. As shown in FIG. 6 for example, the outer casing 34 is horizontally left and right symmetrical about a vertical axial plane on which top and bottom ones of the facet lines designated 44a are located. Similarly, the outer casing 34 is top and bottom symmetrical through a horizontal axial plane on which left and right ones of the facet lines designated 44b are located.

As shown in FIG. 6, the outer casing 34 may be defined by four symmetrical quadrants, with the upper right quadrant I and upper left quadrant II being mirror images of each other. The lower left quadrant III and the lower right quadrant IV are also mirror images of each other. Accordingly, the first quadrant I and the third quadrant III are identical to each other, whereas the second quadrant II and the fourth quadrant IV are identical to each other, but mirror images to the first and third quadrants.

The faceted casing 34 illustrated in FIG. 6 not only has inherent structural rigidity or buckling stiffness over a smooth contoured, non-faceted, duct, but also may be simply and inexpensively manufactured in accordance with another feature of the present invention. As shown schematically in FIG. 6, the method of making the duct 34 initially starts with the analytical definition of its required configuration including opening areas and contours. The duct is then sectioned around its perimeter with a suitable number of circumferential segments as represented by the line dots 44 illustrated in FIGS. 3–5 to best approximate the required annular contours thereof. Next, a suitable number of straight lines 44 are ascribed between the sectioned opposite openings 34a,b of the duct to define a plurality of circumferentially adjoining facets 42. As indicated above, the facets 42 are preferably triangular and include suitably alternating bases 42a and apexes 42b for best approximating the desired contour of the duct between its opposite openings 34a,b.

The three dimensional duct, such as the casing 34 illustrated in FIG. 6, is then suitably unrolled, by mathematical analysis for example, into a flat plane. In view of the four quadrant symmetry of the duct, it may be partitioned into the four quadrants instead of one continuous component.

Figure 8:
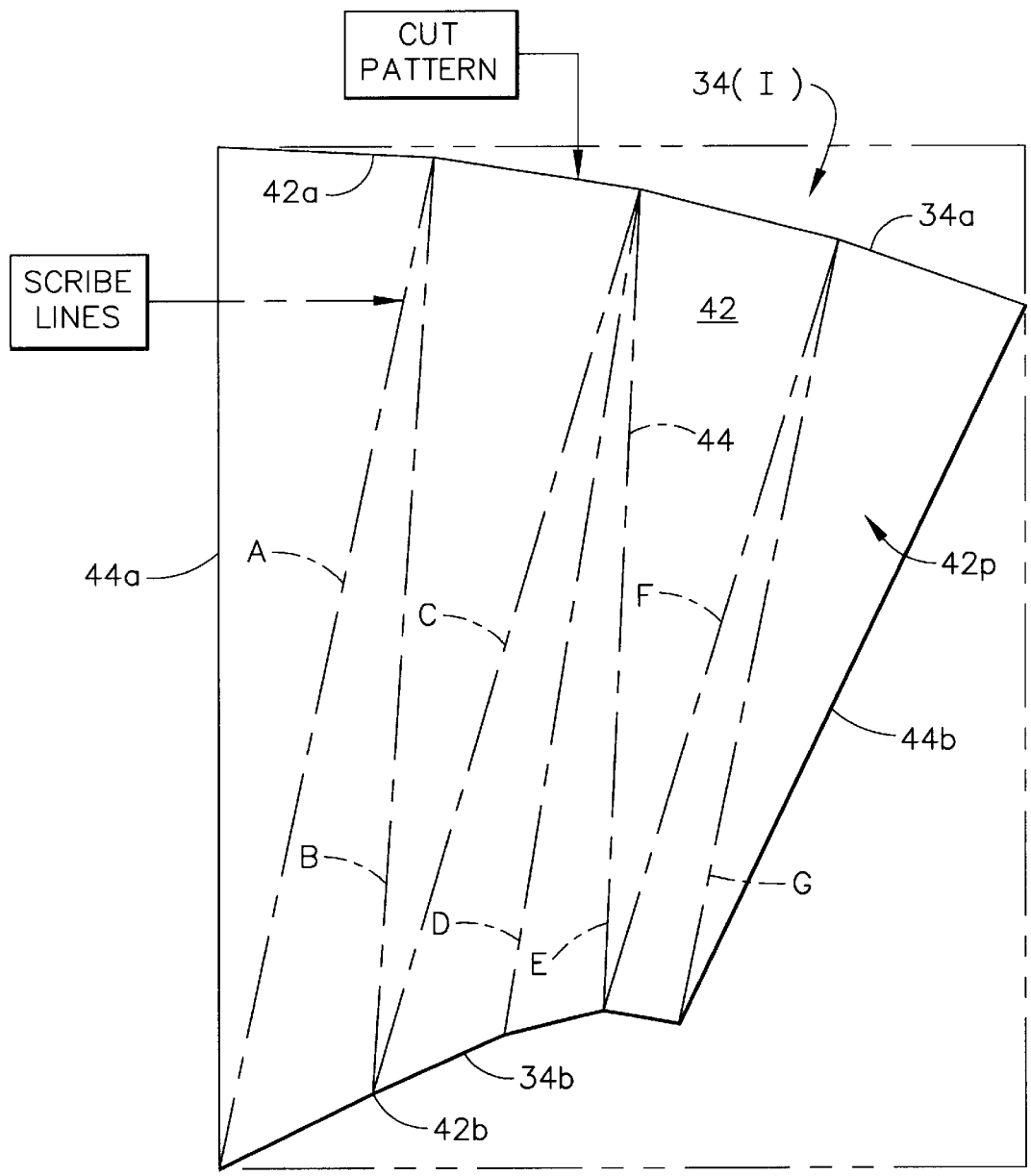
FIG. 8 is a top view of a piece of flat sheet metal plate scribed with lines for making one of the four quadrants of the outer casing illustrated in FIG. 6.

FIG. 8 illustrates a plan view of the first quadrant of the outer casing 34 analytically unrolled into one flat plane. In this way, the duct may be initially formed from a flat sheet metal plate designated 42p. The facet lines 44 and corresponding facets 42 are suitably scribed atop the flat plate 42p for defining the required unfolded pattern thereon. The perimeter of the pattern may then be suitably cut, by shears or cutting torches for example, into the required pattern.

Figure 9:
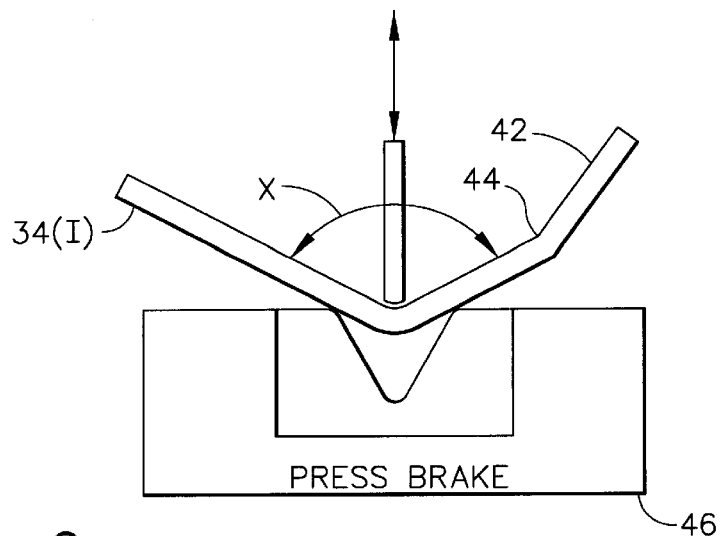
FIG. 9 is a schematic representation of a press brake for bending sheet metal plates to form the various quadrants of the exhaust nozzle including the outer casing illustrated in FIG. 6.

As shown in FIG. 9, the individual flat plate 42p is suitably bent in a conventional press brake 46 at the several facet lines 44, which also define bending lines. As shown in FIG. 8, there are seven bend lines 44 in the exemplary configuration, which may be bent in any suitable order such as the order designated A through G. The press brake 46 is effective for bending the flat plate 42p at each of the bend lines 44 using a radiused ram and cooperating V-block for effecting the facet angle X. In this way, as the plate 42p is bent at each of the lines 44, the respective flat triangular facets 42 are formed and piecewise curvature in flat segments is formed in the plate 42p for forming the annular duct.

In the exemplary embodiment illustrated in FIGS. 8 and 9, each of the four quadrants of the outer casing 34 is separately formed in this manner, with the corresponding four so-formed sheets being suitably assembled together in the configuration illustrated in FIG. 6 and then joined together such as by welding along the abutting ends defining the vertical and horizontal lines 44a,b.

Figure 10:
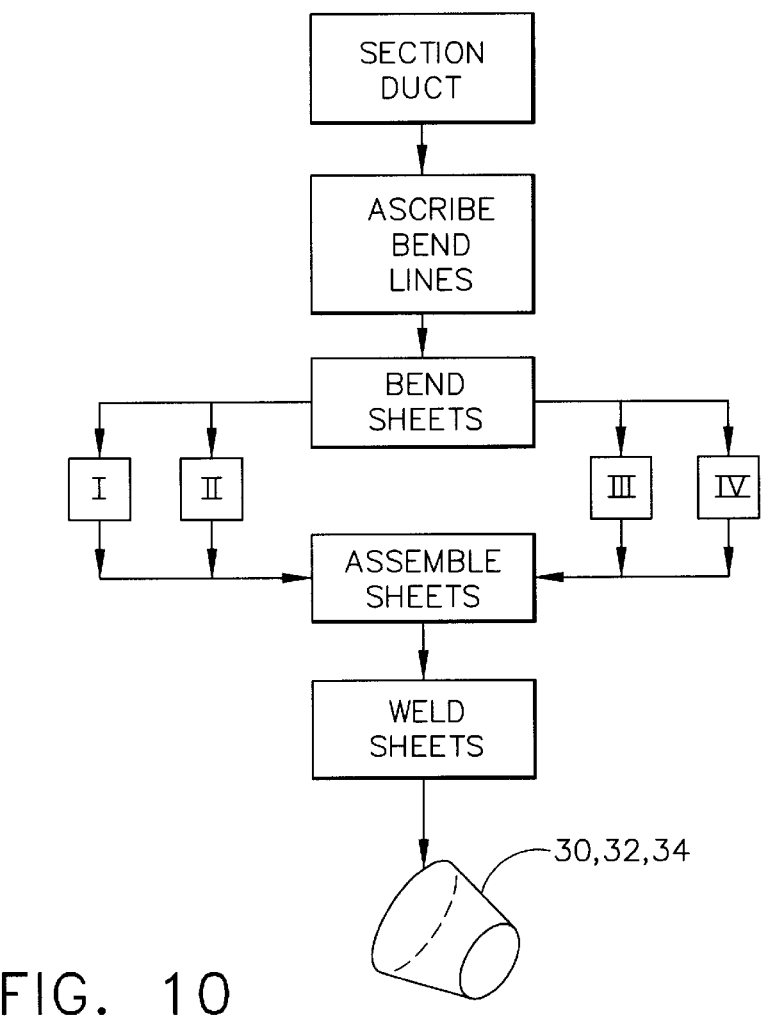
FIG. 10 is a flowchart representation of an exemplary method of making the exhaust nozzle in accordance with the present invention.

The basic method of making a duct such as the outer casing 34 is illustrated in flowchart form in FIG. 10 in accordance with this exemplary method. Although each duct such as the outer casing 34 could be made from a single continuous sheet having all four quadrants initially scribed thereon, and then bent in the press brake 46 to form the entire annular duct with a single split line requiring joining, it is preferred to make the duct in the four symmetrical quadrants as described. In this way, a plurality of smaller plates 42p may be individually bent to form the corresponding arcuate portions of the entire duct, and then the four duct portions or quadrants are joined together in a complete annulus to collectively form the annular duct.

The cutting and bending pattern illustrated in FIG. 8 required for forming the corresponding quadrants of the duct illustrated in FIG. 6 may be obtained by any suitable manner. For example, suitable software may be written to define the configuration of the duct including the facets 42 and the lines 44 in three dimensional space, with the software then calculating the corresponding unrolled contour thereof as illustrated in FIG. 8. Input to the software also includes the desired bend radius at each of the bending lines 44, with the software calculating the required bend angle Y at each of the lines so that the resulting bent sheets may be assembled into the corresponding three dimensional configuration of the duct. This software is generic in designing mounting brackets in general, but is readily applied to the present invention for accurately unrolling the three dimensional faceted duct into its corresponding equivalent unrolled, flat pattern.

Figure 11:
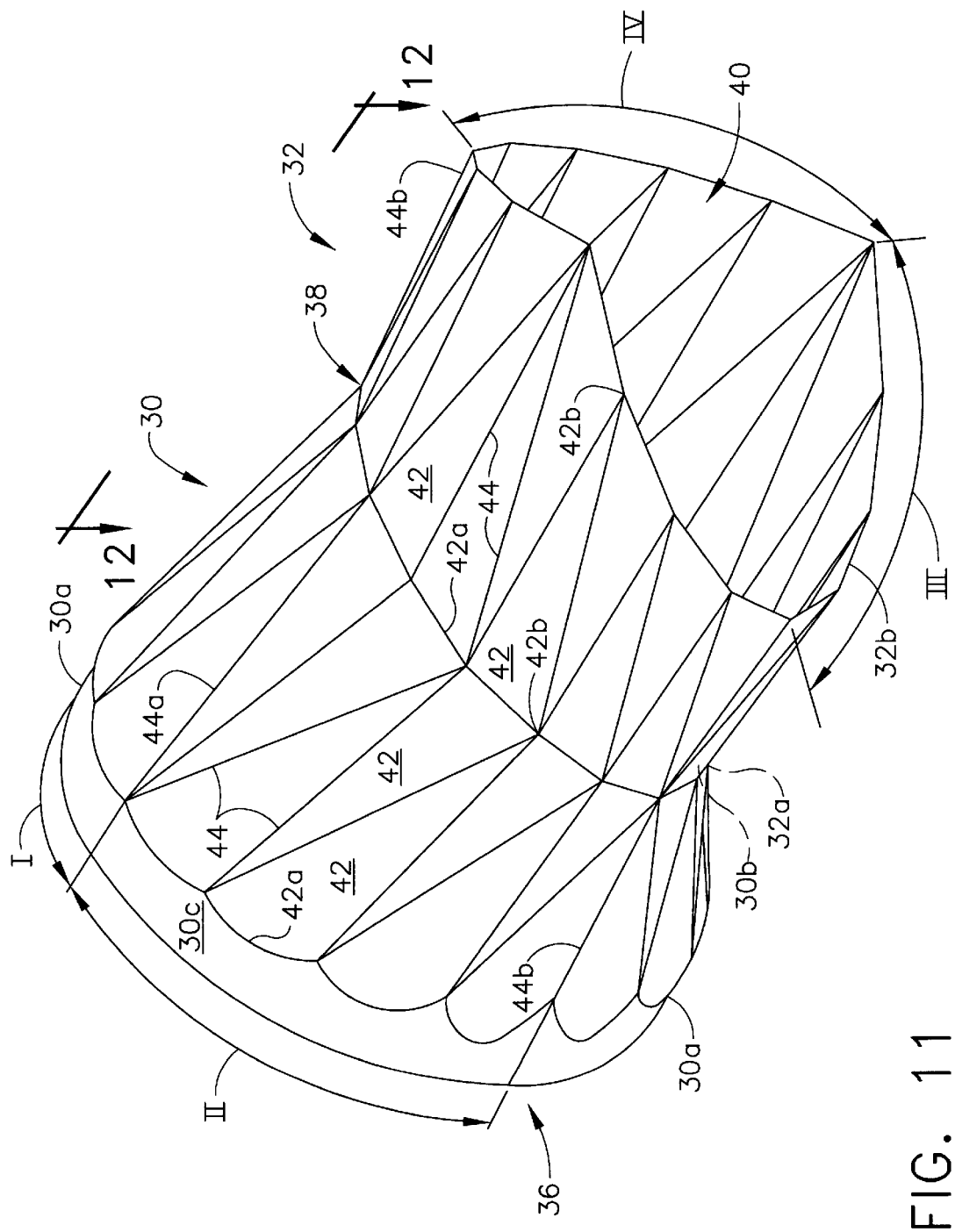
FIG. 11 is an isometric view of the converging and diverging (CD) nozzle portions of the exhaust nozzle illustrated in FIG. 1 within the outer casing in accordance with an exemplary embodiment of the present invention.
Figure 12:
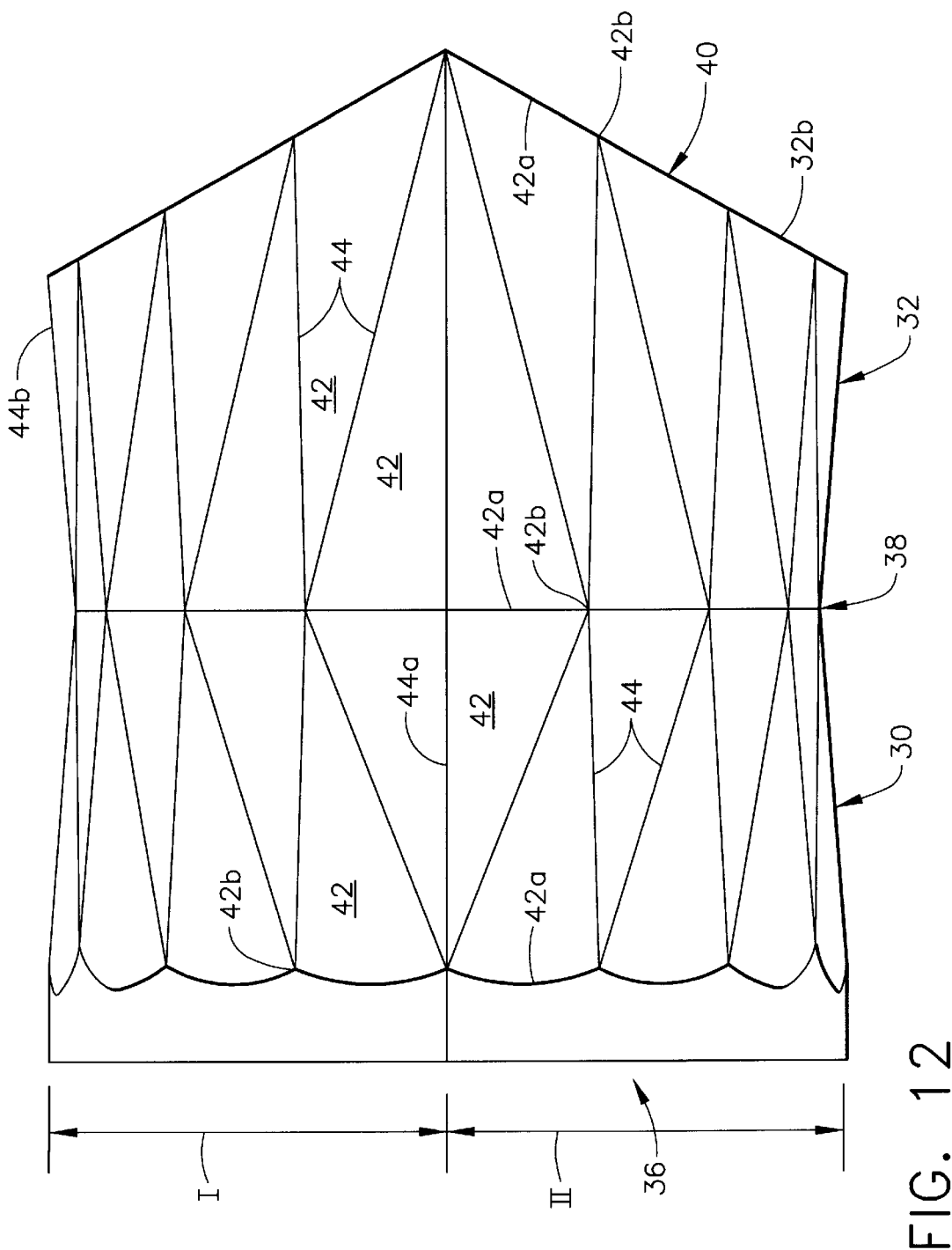
FIG. 12 is a top view of the CD nozzle illustrated in FIG. 11 and taken along line 12—12.

Since the exhaust nozzle 12 is an assembly of three annular components which have different configurations of ducts, the basic method of making each of the these ducts is identical, but specifically configured for the required different shapes of these components. FIGS. 11 and 12 illustrate the converging and diverging nozzles 30, 32 in an exemplary embodiment suitably sectioned and scribed with the bending lines 44 to define the corresponding flat triangular facets 42 in a manner identical to that illustrated in FIGS. 6 and 7.

The converging flow nozzle 30 has coaxial first and second openings 30a,b at opposite axial ends thereof. The diverging nozzle 32 has coaxial first and second openings 32a,b at opposite axial ends thereof. And in the exemplary embodiment illustrated in FIG. 11, the converging nozzle 30 includes a cylindrical inlet piece 30c joined to the first opening 30a for defining the nozzle inlet 36. The respective openings 30b, 32a of the converging and diverging nozzles 30, 32 are joined together to collectively define the throat 38 thereat. As indicated above, an annular slot may be provided at the throat 38 for injecting bypass air into the throat 38 for fluidically varying the effective throat area thereof. And, the second opening 32b of the diverging nozzle is suitably scarfed like the second opening 34b of the outer casing 34 illustrated in FIG. 6 for collectively defining the nozzle outlet 40.

The outer casing 34 illustrated in FIG. 6 coaxially surrounds both the converging and diverging nozzles 30, 32 illustrated in FIG. 11, with the first opening 34a thereof being disposed concentrically around the nozzle inlet 36. The outer casing second opening 34b is suitably fixedly joined, by welding for example, to the diverging nozzle second opening 32b to collectively define the nozzle outlet 40 with the same elliptical cross section and scarf.

As indicated above, the nozzle inlet 36 has a circular contour, the throat 38 has a smaller elliptical contour, and the nozzle outlet 40 has a larger elliptical contour in this exemplary embodiment for effecting converging-diverging (CD) nozzle performance.

The assembled converging and diverging nozzles 30, 32 illustrated in FIG. 11 may be made in suitable components and quadrants in substantially the same manner as the outer casing illustrated in FIG. 6. In this way, the basic faceted duct has three exemplary forms including the converging and diverging nozzles 30, 32 and outer casing 34 collectively defining the exhaust nozzle 12.

In the exemplary embodiment illustrated in FIGS. 11 and 12, the inlet piece 30c of the converging nozzle is preferably cylindrical and therefore does not require any facet lines 44 or facets 42 for its fabrication. It may therefore be formed by conventionally rolling sheet metal into the required curvature once its pattern is determined.

Figure 13:
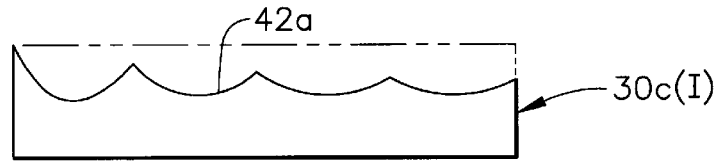
FIG. 13 is a plan view of a flat sheet metal plate for making the inlet portion of the nozzle assembly illustrated in FIG. 12.
Figure 14:
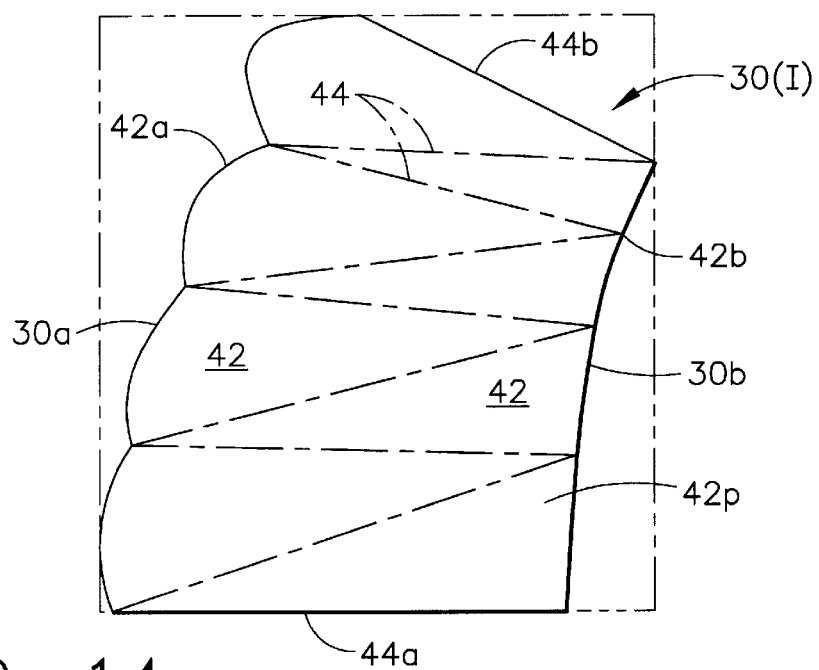
FIG. 14 is a flat sheet metal plate scribed with lines for making one of the four quadrants of the converging nozzle illustrated in FIG. 12.

The first quadrant pattern of the inlet piece 30c illustrated in FIG. 13 is complementary with the axially adjoining converging nozzle portion 30 at its forward end defining the first opening 30a as illustrated in FIG. 14. FIG. 14 illustrates the first quadrant of the converging nozzle 30 in the initial form of a flat sheet metal plate 42p in a manner identical to that illustrated in FIG. 8 for the first quadrant of the outer casing 34. The facet lines 44 and corresponding facets 42 are determined and scribed in a similar manner specific to the converging nozzle 30 for best approximating its contour. Note in this embodiment, that the basically flat triangular facets 42 include arcuate bases 42a as opposed to the straight bases 42a illustrated in the FIG. 8 embodiment to better match the cylindrical contour of the adjoining inlet piece 30c. The plate 42p is then similarly bent at each of the facet lines 44 in the manner illustrated in FIGS. 9 and 10 to form the corresponding faceted quadrant. The process is repeated for each of the four quadrants defining the converging nozzle 30 which are then suitably assembled together and welded, for example, along with the separately formed inlet piece 30c, which may be made in one or more corresponding pieces as desired.

Figure 15:
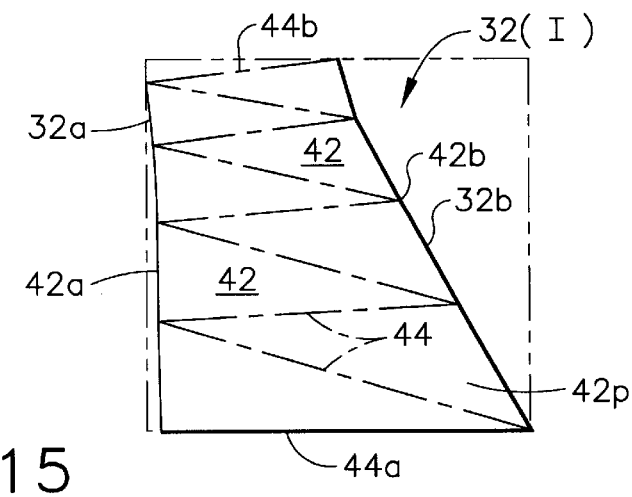
FIG. 15 is a flat sheet metal plate scribed with lines for making one of the four quadrants of the diverging nozzle illustrated in FIG. 12.

Similarly, the diverging nozzle 32 illustrated in FIG. 11 is sectioned for defining the corresponding facet lines 44 and facets 42. The diverging nozzle 32 like the converging nozzle 30 and outer casing 34 is suitably unrolled to the flat quadrant form illustrated in FIG. 15, with the facet lines 44 and outer pattern being scribed thereon. The pattern is suitably cut, and the initially flat plate 42p is suitably bent along the facet lines 44 in the press brake illustrated in FIG. 9 to similarly form the corresponding four quadrants of the diverging nozzle 32 which are suitably assembled and welded together.

FIG. 11 illustrates the final assembly and welding together of the converging and diverging nozzles 30, 32 formed in an identical manner in the corresponding four quadrants described above. The facets 42 and facet lines 44 of the individual components illustrated in FIG. 11 are preferably identical at the intersection lines between the converging nozzle 30 and the diverging nozzle 32, as well as between the inlet piece 30c and the converging portion of the nozzle 30.

As shown in FIGS. 7 and 12, the facet lines 44 and facets 42 of the diverging nozzle 32 and the outer casing 34 are selected to match at the respective, aft second openings 32b and 34b thereof. In this way, when the outer casing 34 is assembled around the diverging nozzle 32, the respective aft openings thereof will align together for being suitably fixedly joined along a common annular joint collectively defining the nozzle outlet 40.

The exhaust nozzle 12 as so configured and fabricated is relatively simple and lightweight yet is relatively strong. Since the various components of the nozzle 12 are preferably formed from relatively thin sheet metal plate, the triangular facets 42 bent at the facet lines 44 provide inherent strength and buckling stiffness as compared to an otherwise continuous smooth nozzle without the facets. And, additionally significant is the ability to fabricate the entire nozzle from initially flat sheet metal plate using the press brake 46 in a relatively simple process for bending the components into piecewise arcuate quadrants assembled together to form the complete annular contours of the converging and diverging nozzles 30, 32 and the surrounding outer casing 34. This results in a lightweight and low cost nozzle design closely approximating the aerodynamic efficiency of a continuously smooth optimum nozzle.

If desired, suitable stiffening ribs may be separately attached around each of the converging and diverging nozzles 30, 32 and along the inner surface of the outer casing 34 (not shown) to provide additional structural stiffness as required. The sheet metal plates defining the converging and diverging nozzles 30, 32 may simply form the innermost liners thereof which directly bound the exhaust gases 22, and may themselves be supported to suitable surrounding frames for both increased strength as well as providing backside cooling of the nozzles.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. A gas turbine engine duct comprising a plurality of flat triangular facets rigidly joined together circumferentially in a mixed geometry, with coaxial first and second openings at opposite ends thereof.

2. A duct according to claim 1 wherein said first and second openings have different areas and contours, and said facets have bases and apexes alternating therebetween.

3. A duct according to claim 2 wherein said facets have inner surfaces adjoining at obtuse included facet angles.

4. A duct according to claim 3 defining a converging nozzle for channeling combustion exhaust gases therethrough, with said first opening defining a nozzle inlet for receiving said gases, and said second opening defining a throat of minimum flow area.

5. A nozzle according to claim 4 wherein said inlet has a circular contour, and said throat has a smaller elliptical contour.

6. A duct according to claim 3 defining a diverging nozzle for channeling combustion exhaust gases therethrough, with said first opening defining a throat of minimum flow area, and said second opening defining a nozzle outlet of larger flow area.

7. A nozzle according to claim 6 wherein said throat has an elliptical contour, and said outlet has a larger elliptical contour.

8. A duct according to claim 3 configured in three forms defining a gas turbine engine exhaust nozzle comprising:

a converging nozzle for channeling combustion exhaust gases therethrough, with said first opening thereof defining a nozzle inlet for receiving said gases, and said second opening thereof defining a throat of minimum flow area;

a diverging nozzle, with said first opening thereof being fixedly joined to said second opening of said converging nozzle to define therewith said throat, with said second opening thereof defining a nozzle outlet of larger flow area than said throat; and an outer casing surrounding both said converging nozzle and diverging nozzle, with said first opening thereof being disposed concentrically around said nozzle inlet, and said second opening thereof being fixedly joined to said diverging nozzle second opening to define said nozzle outlet.

9. An exhaust nozzle according to claim 8 wherein said inlet has a circular contour, said throat has a smaller elliptical contour, and said outlet has a larger elliptical contour.

10. A method of making a gas turbine engine duct having a plurality of circumferentially adjoining flat triangular facets and coaxial first and second openings at opposite ends thereof, comprising:

scribing a plurality of straight lines on a flat sheet metal plate to define said facets; and bending said plate at each of said lines around each of said flat facets to collectively form said duct.

11. A method according to claim 10 wherein said facets have bases and apexes alternating on said plate to form said first and second openings with different areas and contours.

12. A method according to claim 11 further comprising:

scribing said facets on a plurality of said plates;

bending each of said plates to form arcuate portions of said duct; and joining together said duct portions in an annulus to form said duct.

13. A method according to claim 11 wherein said first and second openings have different areas and contours, and said facets have bases and apexes alternating therebetween.

14. A method according to claim 13 wherein said facets have inner surfaces adjoining at obtuse included facet angles.

15. A method according to claim 11 wherein said first opening has a circular contour, and said second opening has a smaller elliptical contour.

16. A method according to claim 11 wherein said first opening has an elliptical contour, and said second opening has a larger elliptical contour.

17. A gas turbine engine exhaust nozzle comprising a plurality of triangular facets rigidly joined together circumferentially in a fixed geometry.

18. A nozzle according to claim 17 further comprising coaxial first and second openings at opposite ends of said facets having different areas and contours.

19. A nozzle according to claim 18 wherein one of said openings has an elliptical contour.

20. A nozzle according to claim 19 wherein said facets have inner surfaces adjoining at obtuse included facet angles.

21. A gas turbine engine duct comprising a sheet having straight bends rigidly joining a plurality of flat triangular facets circumferentially in a fixed annular geometry.

22. A duct according to claim 21 further comprising coaxial first and second openings at opposite ends of said facets having different areas and annular contours.

23. A duct according to claim 22 wherein said facets are circumferentially aligned and rigidly continuous at said bends to effect a flat segmented approximation of said annular contours.

24. A duct according to claim 23 wherein all said facets circumferentially adjoin each other at corresponding bends with an obtuse internal included facet angle therebetween.

25. A duct according to claim 23 wherein said first opening has an elliptical contour.

26. A duct according to claim 23 wherein said first opening has a circular contour.

27. A duct according to claim 23 wherein said first opening has a circular contour, and said second opening has an elliptical contour.

28. A duct according to claim 23 wherein said first opening has an elliptical contour, and said second opening has a larger elliptical contour.

29. A duct according to claim 23 wherein said sheet is unitary and includes a plurality of said facets therein.

30. A duct according to claim 29 further comprising a plurality of said sheets rigidly joined together circumferentially.

31. A duct according to claim 30 further comprising four of said sheets configured in four symmetrical quadrants.

* * * * *